United States Patent [19]

Okano et al.

[11] Patent Number: 5,370,350
[45] Date of Patent: Dec. 6, 1994

[54] SEAT SLIDE DEVICE

[75] Inventors: Yoshimasa Okano; Moriyuki Eguchi, both of Ayase, Japan

[73] Assignee: Ikeda Bussan Co., Ltd., Ayase, Japan

[21] Appl. No.: 141,955

[22] Filed: Oct. 28, 1993

[30] Foreign Application Priority Data

Oct. 28, 1992 [JP] Japan .................. 4-290554

[51] Int. Cl.⁵ ............................................. B60N 1/00
[52] U.S. Cl. .................................. 248/430; 248/420; 384/47
[58] Field of Search ............... 248/430, 429, 420, 298, 248/419, 424; 384/34, 55, 49, 47; 297/317.8, 322, 329, 346

[56] References Cited

U.S. PATENT DOCUMENTS

| | | | |
|---|---|---|---|
| 4,262,963 | 4/1981 | Bauer et al. | 248/430 X |
| 4,892,282 | 1/1990 | Suzuki et al. | 248/430 |
| 4,940,285 | 7/1990 | Suzuki | 248/430 X |
| 4,949,932 | 8/1990 | Terai | 248/430 |
| 5,137,244 | 8/1992 | Negi | 248/430 |
| 5,167,393 | 12/1992 | Hayakawa et al. | 248/430 |
| 5,192,045 | 3/1993 | Yamada et al. | 248/430 |
| 5,222,814 | 6/1993 | Boelryk | 248/430 |

FOREIGN PATENT DOCUMENTS 0295143 12/1986 Japan .................. 248/430

*Primary Examiner*—Karen J. Chotkowski
*Attorney, Agent, or Firm*—Foley & Lardner

[57] ABSTRACT

A seat slide device including a lower light-alloy guide rail rigidly mounted on a floor panel through a leg member attached to the lower rail, an upper light-alloy guide rail which is slidably fitted to the lower rail and firmly secured to the bottom of a seat, and bearings rotatably disposed between the upper and lower rails, comprises a reinforcement arranged along the inner wall of the rear end of the lower rail for enhancing a rigidity of the rear end. The leg member is arranged along the outer wall of the rear end of the lower rail in a position where the reinforcement and the lower rail are overlapped with each other so that the three members are stratified to each other. The three-stratified members are integrally coupled to each other by fastening rivets. The reinforcement is integrally formed with a bearing stopper restricting a maximum rearward displacement of the bearings.

4 Claims, 4 Drawing Sheets

SEAT SLIDE DEVICE

BACKGROUND OF THE INVENTION

1. Field of the Invention

The present invention relates to a seat slide device suitable for use in an automotive vehicle in which employs at least one pair of guide rails, and specifically to a seat slide device employing an upper slidable guide rail made of light-alloy and firmly secured onto the bottom surface of the automobile seat and a lower stationary guide rail made of light-alloy and rigidly mounted on the floor panel of the vehicle body by means of a leg member, which is capable of adjusting the position of the automobile seat assembly in a direction generally parallel to the longitudinal direction of the vehicle body by varying a relative position of one of the rails to the other through bearings rotatably disposed therebetween.

2. Description of the Prior Art

Recently, there have been proposed and developed various automobile small-sized and light-weight seat slide devices. One such light-weight seat slide device is shown in FIGS. 6 and 7. The light-weight seat slide device is generally comprised of an upper rail 1 made of light-alloy such as aluminum alloy, a lower rail 2 made of light-alloy such as aluminum alloy and bearings 3 made of steel balls disposed between the rails 1 and 2 to permit one of the rails to smoothly move relatively to the other. In general, the respective bearing 3 rotatably moves together with the upper rail 1 by way of a carrier (not shown) attached to the upper rail 1. As clearly seen in FIG. 7, the seat slide rail is traditionally formed with a stopper 2a for restricting a relative displacement of the bearing 3 to the lower rail 2 in one direction thereof. The stopper 2a is formed by cutting out a portion of the upper edge of the side wall at the rear end of the lower rail 2 and by bending the cut-out portion outside of the side wall surface of the rail. The lower rail 2 is rigidly mounted on the floor panel of the vehicle by way of a leg member 4. As shown in FIG. 6, the leg member 4 is fitted to the bottom of the lower rail 2 at the rear end thereof and firmly fixed to the lower rail 2 by means of rivets 5. Alternatively, the leg member may be fixed firmly to the bottom of the lower rail by welding. In the previously-noted prior art seat slide rail device, since the bearing stopper 2a was formed by machining a portion of the lower rail, by way of both cutting-out and bending, undesirable excessive stress would be concentrated at the cut-out and bent section of the lower rail 2. That is, a mechanical strength is remarkably lowered at the cut-out and bent portion of the lower rail 2. For the afore-mentioned reasons, there is a tendency for the lower rail 2 to be deformed at the relatively weaker cut-out and bent section functioning as a bearing stopper. As set forth above, the conventional light-weight slide rail device suffers from the drawback that a smooth sliding movement of the upper rail 1 relative to the lower rail 2 cannot be obtained owing to such deformation at the cut-out stopper of the lower rail.

In the case of excessively large upward break-away load which acts upwardly to break the seat away from the floor panel, e.g. during quick braking, there is a possibility that the lower rail 2 and the floor panel are broken away from each other, because the bottom section of the light-alloy rail 2 has a relatively less rigidity, as compared with the rail mounting member, i.e., the lower-rail mounting leg 4 and in addition a mechanical strength of aluminum alloy is in general inferior to steel. As set forth above, since the mounting strength of the seat slide assembly on the floor panel is dependent on a rigidity of the bottom section of the lower rail onto which the leg member 4 is attached, it is advantageous to enhance a rigidity and a mounting strength of the mounting section of the lower rail 2 on the floor panel.

SUMMARY OF THE INVENTION

It is, therefore in view of the above disadvantages an object of the present invention to provide an improved light-weight seat slide device which employs a stopper reliably restricting a maximum rearward displacement of bearings operably disposed between upper and lower light-alloy rails to the lower rail and assures a smooth sliding movement of the upper rail relative to the lower rail.

It is another object of the invention to provide a seat slide device with at least one set of light-alloy rails, which provides a satisfactorily enhanced mounting strength of the seat slide rail on the floor panel.

It is a further object of the invention to provide a high-rigidity light-alloy seat slide rail structure which enables the seat slide rail to be reliably mounted on the floor panel with a high mechanical strength.

It is a still further object of the invention to provide a bearing stopper which can reliably restrict a maximum rearward displacement of bearings operably disposed between vertically opposed inside walls of one fitted pair of light-alloy rails, while avoiding stress-concentration on a particular point of the lower rail.

It is another object of the invention to provide a seat slide device with at least one set of light-alloy rails, which is proof against excessively large upward break-away load acting upwardly to break the seat away from the floor panel.

In brief, the above objects are achieved by a high-rigidity three-stratified rail mounting structure which is comprised of the rear end portion of a lower rail, a rail mounting leg, and a reinforcement sandwiched between the rear end of the lower rail and the rail mounting leg. The reinforcement is arranged in an internal space defined between the fitted pair of rails and formed with a bearing stopper which serves to restrict a maximum rearward displacement of bearings operably disposed between the rails.

According to one aspect of the invention, a seat slide device including a lower stationary guide rail which is made of light-alloy and rigidly mounted on a floor panel through a leg member attached to the lower rail, an upper guide rail which is made of light-alloy and slidably fitted to the lower rail and firmly secured to the bottom of a seat, and bearings which are rotatably disposed between vertically opposed inside walls of the upper and lower rails, comprises a reinforcement arranged along the inner wall of the rear end of the lower rail, for enhancing a rigidity of the rear end, the leg member arranged along the outer wall of the rear end of the lower rail in a position where the reinforcement and the lower rail are overlapped with each other, so that the three members are stratified each other. The three-stratified members are integrally coupled to each other by fastening means such as rivets. The reinforcement is integrally formed with a bearing stopper restricting a maximum rearward displacement of the bearings.

According to another aspect of the invention, a seat slide rail structure comprises an upper light-alloy guide rail which is firmly secured to the bottom of a seat, the upper rail including an upper wall section, a pair of side wall sections downwardly extending from both ends of the upper wall section, and a pair of upwardly turned sections each being turned upwards at the lower end of the side wall section, a lower light-alloy guide rail which is rigidly mounted on a floor panel through a stepped leg member attached to the lower rail, the lower rail including a bottom section, a pair of side wall sections downwardly extending from both ends of the bottom section, and a pair of downwardly turned sections each being turned downwards in the vicinity of the upper end of the side wall section of the lower rail, and the upwardly turned sections of the upper rail are slidably fitted to the downwardly turned sections of the lower rail to surround the latter, respectively, bearings which are rotatably disposed between vertically opposed inside walls of the upper and lower rails, and a substantially U-shaped reinforcement fitted to the inner wall of the rear end of the lower rail, for enhancing a rigidity of the rear end. The stepped leg member includes a rail fitting portion and a floor-panel fitting portion, the rail fitting portion being fitted to the outer wall of the rear end of the lower rail in a position where the reinforcement and the lower rail are overlapped with each other, so that the three members are stratified each other. The three-stratified members are integrally coupled to each other by fastening means. The reinforcement is integrally formed with a pair of tab-like bearing stoppers restricting a maximum rearward displacement of the bearings. Each tab-like bearing stopper is formed to transversely outwardly extend from the upper end of the side wall section of the reinforcement, so that the tab-like bearing stopper hermetically covers the associated upper end of the side wall section of the lower rail.

The top end of the tab-like bearing stopper may preferably come into contact with the root of the downwardly turned section of the lower rail, for suppressing the downwardly turned section of the lower rail to be deformed outwards, when the downwardly turned section of the lower rail is pressed upwards in accordance with an upward displacement of the upwardly turned section of the upper rail, owing to break-away load acting upwardly to break the seat away from the floor panel. The lower rail includes a pair of bearing guide grooves at the upper ends of the side walls, and each downwardly turned section of the lower rail is turned downwards at a position slightly offsetting from the upper end of the side wall section, and the tab-like bearing stopper may be slightly bent downwards from the upper end of the side wall so that one end of the tab-like bearing stopper receives a center of gravity of the bearings. It is preferable that the tab-like bearing stopper is rectangular in shape.

DESCRIPTION OF THE PREFERRED EMBODIMENTS

Figure 1:
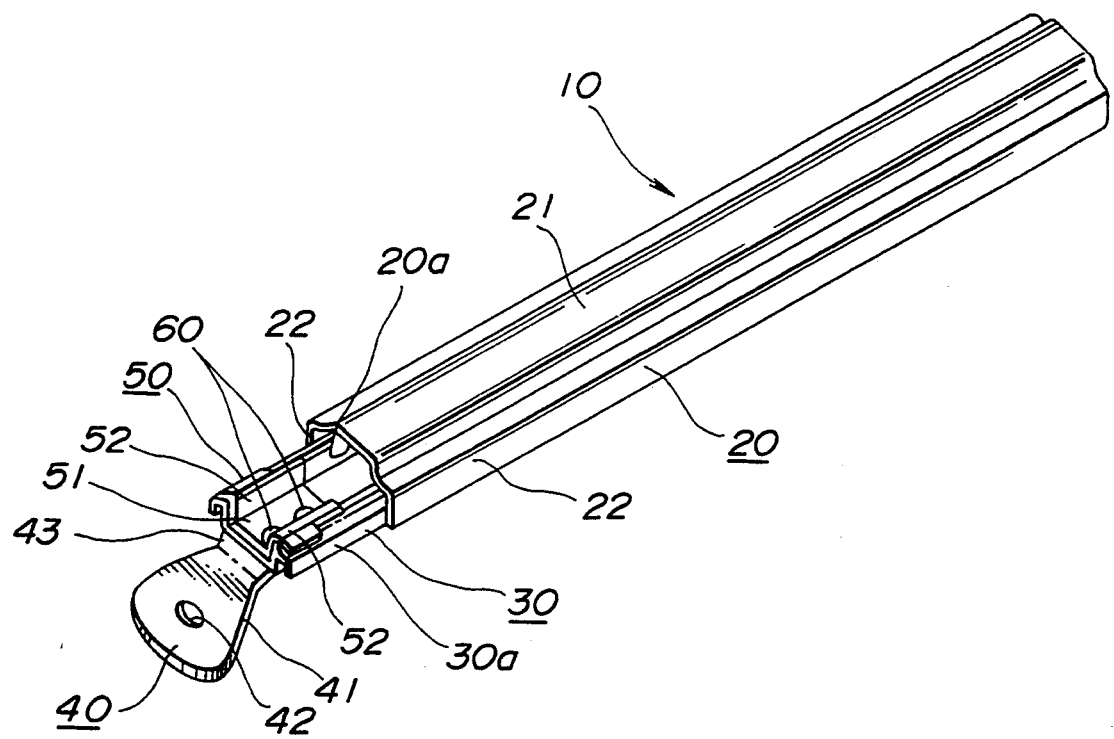
FIG. 1 is a perspective view illustrating one embodiment of a seat slide device according to the present invention.
Figure 2:
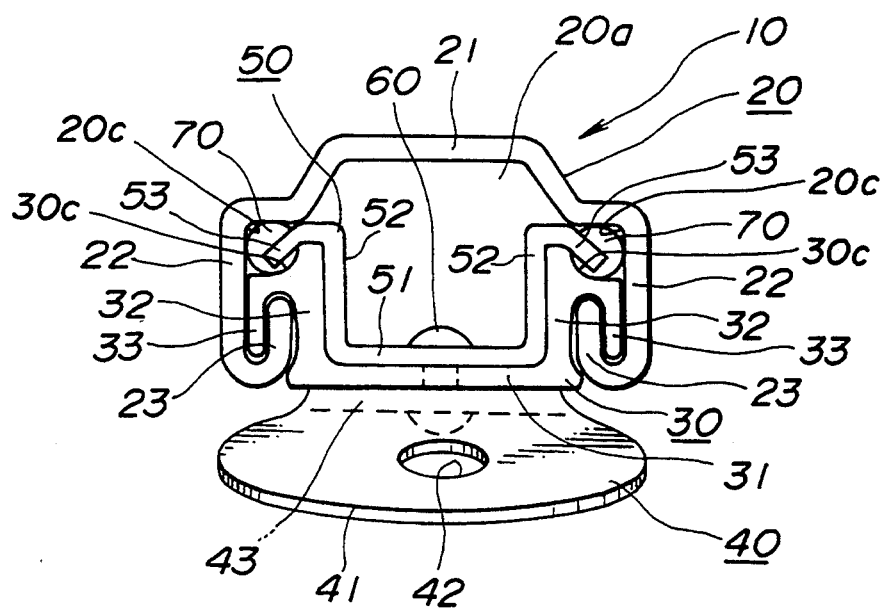
FIG. 2 is a view illustrating the rear end of the seat slide device of the embodiment.
Figure 3:
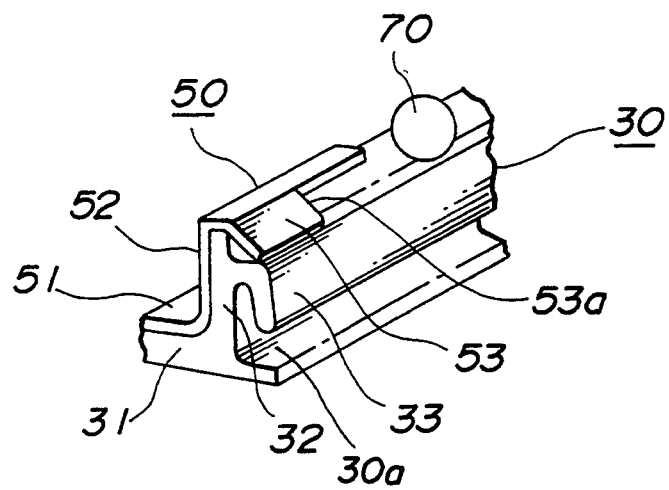
FIG. 3 is a perspective view partly illustrating a relationship between a bearing, a lower slide rail and a reinforcement.
Figure 4:
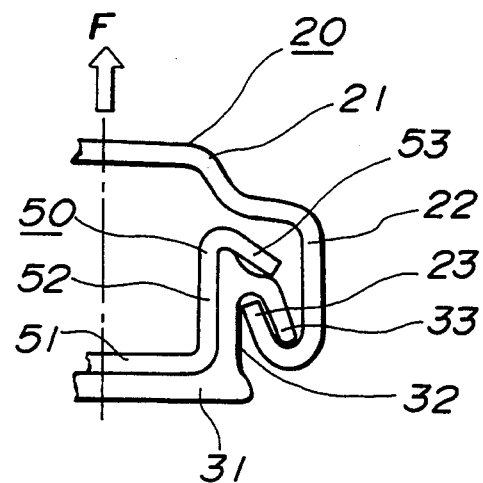
FIG. 4 is a view illustrating the operation of the reinforcement against upward break-away load acting on the lower seat rail through the upper seat rail.
Figure 5:
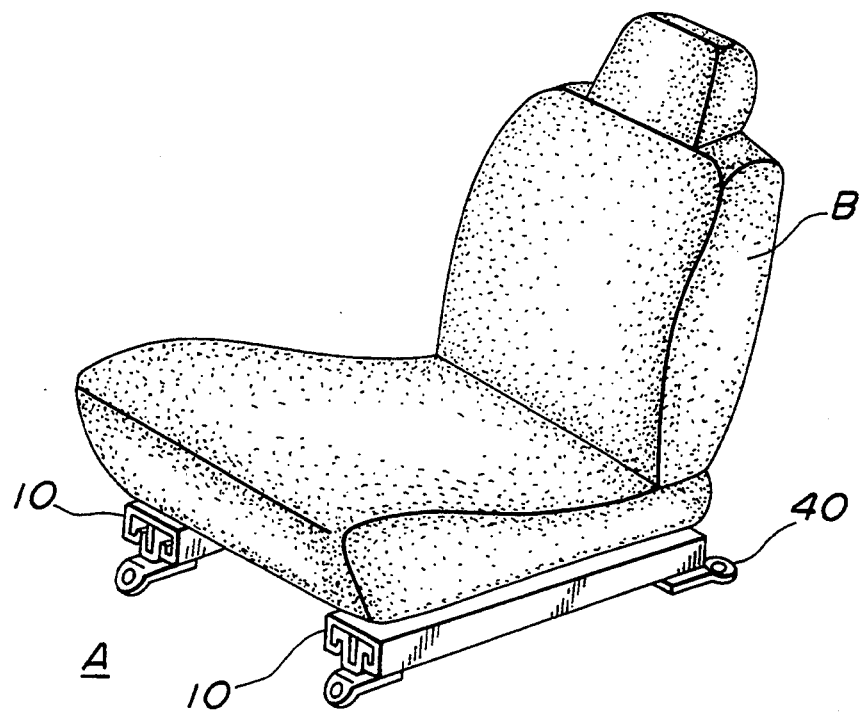
FIG. 5 is a perspective view illustrating a seat equipped with the seat slide device according to the invention.
Figure 6:
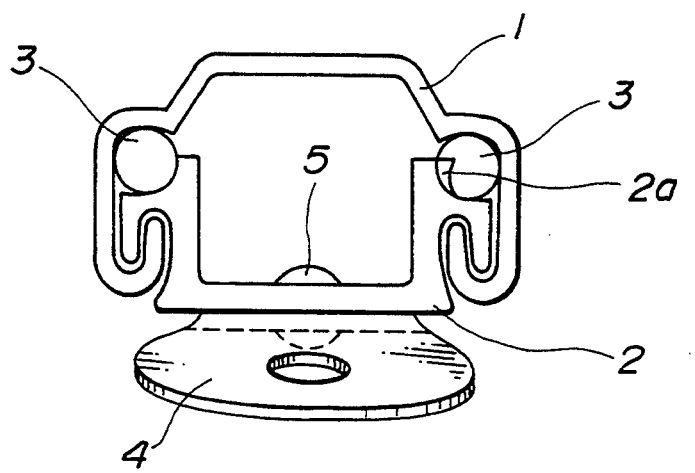
FIG. 6 is a view illustrating the rear end of a prior art seat slide device.
Figure 7:
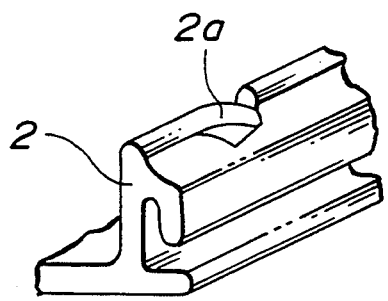
FIG. 7 is a perspective view partly illustrating a cut-out stopper formed at the upper edge of a lower rail in a prior art seat slide device.

Referring now to the drawings, particularly to FIGS. 1 through 3, the seat slide device of the invention is exemplified in case of an automobile seat slide device. As seen in FIG. 1, the seat slide device 10 of the embodiment includes a lower stationary guide rail 30 rigidly mounted on the floor panel of the vehicle body by way of a rail mounting leg 40, an upper slidable guide rail 20 firmly secured onto the bottom surface of the automobile seat and slidably fitted onto the lower rail 30 to adjust the position of the automobile seat assembly in the longitudinal direction of the vehicle body by varying a relative position of the upper rail 20 to the lower rail 30, and bearings 70 rotatably disposed between the rails 20 and 30 to cause a smooth sliding movement of the upper rail 20 to the lower rail 30. As seen in FIG. 2, the lower rail 30 has a reversed hat shape in cross section and made of light-alloy mainly including aluminum. The lower rail 30 is comprised of an essentially flat elongated bottom section 31, a pair of side wall sections 32 vertically extending from both ends of the bottom section 31, and a pair of outwardly downwardly turned sections 33 each being turned downwards at the position slightly offsetting from the upper end of the side wall section 32. On the other hand, the upper rail 20 has a substantially reversed U shape in cross section and made of light-alloy mainly including aluminum. The upper rail 20 is comprised of a substantially hat-shaped flat upper wall section 21, a pair of side wall sections 22 vertically extending from both ends of the upper wall section 21, and a pair of inwardly upwardly turned sections 23 each being turned upwards at the lowermost end of the side wall section 22. In usual, the bearings 70 include ball bearings and rotatably supported by means of a bearing carrier attached to the upper rail. In the embodiment, although the bearings 70 consists of ball bearings, different type bearings, such as roller bearings may be utilized. The upper and lower rails 20 and 30 are coupled to each other in such a manner that the opening of the upper rail 20 faces the opening of the lower rail 30 and that the upwardly turned section 23 of the upper rail 20 is slidably fitted to the associated downwardly turned section 33. Reference numeral 20a designates an internal space defined in the fitted pair of guide rails. In more detail, the internal space 20a is defined by the respective inner walls of the bottom section 31 and the side wall sections 32, and the inner wall of the upper wall section 21. A substantially right-angled inside corner 20c is defined by the inner wall surface of the upper wall section 21 and the inner wall surface of the side section 22. In addition, a ball-bearing guide groove 30c is formed on the lower rail 30 in such a manner as to be curved from the upper end of the side wall section 32 to the root of the downwardly turned section 33. The bearings 70 are rotatably disposed in an aperture defined by the right-angled inside corner 20c and the bearing guide groove 30c. The previously noted rail structure is well known. Note that a substantially U-shaped reinforcement 50 is provided at the rear end 30a of the lower rail 30 in a manner so as to be fitted onto the inside wall surface of the lower rail 30. The reinforcement 50 enhances a rigidity of a rail-mounting portion at the lower rail end 30a. A rail-mounting leg member 40 is further fitted onto the outside wall surface of the lower rail 30 at the rail end 30a wherein the reinforcement 50 and the lower rail 30 are overlapped one another. Under this condition wherein three members, namely the reinforcement 50, the lower rail end 30a and the rail-mounting leg member 40 are stratified each other, the three members are integrally coupled to each other as a single lower rail unit by fastening means such as rivets 60. The above-noted three-stratified rail mounting structure assures a high rigidity at the rail mounting portion on the floor panel and enhances the durability against large upward break-away load acting upwardly to break the seat away from the floor panel. As clearly shown in FIG. 3, the reinforcement 50 includes a bottom section 51 extending along the inner wall surface of the bottom section 31 and a pair of side wall sections 52 respectively extending along the inner wall surfaces of the side wall sections 32. The reinforcement 50 also includes a pair of substantially rectangular tab-like portions 53 each transversely outwardly extending from the upper end of the side wall section 52 and slightly downwardly bent from the side wall end, so that the tab-like portions 53 hermetically cover the upper ends of the side wall sections 32 and that the top end of the tab-like portion 53 comes into contact with the root of the downwardly turned section 33 and that the rear end 53a of the tab-like portion 53 receives a center of gravity of the ball bearings 70. As seen in FIG. 3, the length of the tab-like portion 53 is approximately half as large as the overall length of the reinforcement 50. The front end 53a of the tab-like portion 53 serves as a stopper reliably restricting a maximum rearward displacement of the bearings 70 rotatably disposed between the light-alloy rail set. In the seat slide device according to the invention, since the reinforcement 50 itself is integrally formed with a tab-like bearing stopper 53, it is unnecessary to cut out and bend a portion of the upper edge of the side wall of the lower rail to form the bearing stopper. Thus, there is no stress-concentration on a particular portion of the lower guide rail. As set forth above, since the lower rail 30 cannot be easily deformed by means of the reinforcement 50 with the bearing stopper, the seat slide device of the embodiment insures a smooth sliding movement of the upper rail 20 in respect to the lower rail 30. In addition, the respective tab-like portion 53 functions to suppress the downwardly turned section 33 of the lower rail to be deformed outwards, when the downwardly turned section 33 is pressed upwards in accordance with an upward displacement of the upwardly turned section 23 of the upper rail, owing to large break-away load F acting upwardly to break the seat assembly B away from the floor panel A. As shown in FIG. 5, the lower rail end 30a is firmly secured onto the floor panel A through the rail-mounting leg member 40 by means of bolts. Returning to FIGS. 1 and 2, the rail-mounting leg member 40 comprises a floor-panel fitting portion 41 firmly secured onto the floor panel of the vehicle body and having a circular hole 42 for a fastening bolt, a rail fitting portion 43 firmly coupled to the rear end 30a of the lower rail 30 together with the reinforcement 50 by riveting, and an intermediate sloped portion (not numbered) interconnecting the floor-panel fitting portion 41 and the rail fitting portion 43 in a manner which the two fitting portions 41 and 43 are slightly stepped or joggled.

While the foregoing is a description of the preferred embodiment carried out the invention, it will be understood that the invention is not limited to the particular embodiment shown and described herein, but that various changes and modifications may be made without departing from the scope or spirit of this invention as defined by the following claims.

What is claimed is:

1. A seat slide rail structure comprising:
   an upper light-alloy guide rail firmly secured to the bottom of a seat, said upper rail including an upper wall section, a pair of side wall sections downwardly extending from both ends of the upper wall section, and a pair of upwardly turned sections each being turned upwards at the lower end of said side wall section;
   a lower light-alloy guide rail rigidly mounted on a floor panel through a stepped leg member attached to the lower rail, said lower rail including a bottom section, a pair of side wall sections downwardly extending from both end of said bottom section, and a pair of downwardly turned sections each being turned downwards in the vicinity of a upper end of said side wall section of said lower rail, and said upwardly turned sections of said upper rail are slidably fitted to said downwardly turned sections of said lower rail to surround the latter, respectively;
   bearings rotatably disposed between vertically opposed inside walls of said upper and lower rails; and
   a substantially U-shaped reinforcement fitted to the inner wall of the rear end of said lower rail, for enhancing a rigidity of the rear end;
   said stepped leg member including a rail fitting portion and a floor-panel fitting portion, said rail fitting portion being fitted to the outer wall of the rear end of said lower rail in a position where said reinforcement and said lower rail are overlapped with each other, so that the three members are stratified each other;
   wherein said three-stratified members are integrally coupled to each other by fastening means;
   wherein said reinforcement is integrally formed with a pair of tab-like bearing stoppers restricting a maximum rearward displacement of said bearings; and
   wherein each of said tab-like bearing stoppers is formed to transversely outwardly extend from the upper end of the side wall section of said reinforcement, so that said tab-like bearing stopper hermetically covers the associated upper end of the side wall section of said lower rail.

2. The seat slide rail structure as set forth in claim 1, wherein the top end of said tab-like bearing stopper comes into contact with a root of said downwardly turned section of said lower rail, for suppressing the downwardly turned section of said lower rail to be deformed outwards, when the downwardly turned section of said lower rail is pressed upwards in accordance with an upward displacement of the upwardly turned section of said upper rail, owing to break-away load acting upwardly to break the seat away from the floor panel.

3. The seat slide rail structure as set forth in claim 2, wherein said lower rail includes a pair of bearing guide grooves at the upper ends of the side walls, and each downwardly turned section of said lower rail is turned downwards at a position slightly offsetting from the upper end of the side wall section, and said tab-like bearing stopper is slightly bent downwards from the upper end of the side wall so that one end of said tab-like bearing stopper receives a center of gravity of said bearings.

4. The seat slide rail structure as set forth in claim 3, wherein said tab-like bearing stopper is rectangular in shape.

* * * * *